(12) United States Patent
Lu et al.

(10) Patent No.: US 7,055,218 B2
(45) Date of Patent: Jun. 6, 2006

(54) HINGE

(75) Inventors: Shen-Nan Lu, Shulin (TW); Hsiang-Chi Chien, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 84 days.

(21) Appl. No.: 10/857,812

(22) Filed: Jun. 1, 2004

(65) Prior Publication Data

US 2005/0283949 A1    Dec. 29, 2005

(51) Int. Cl.
*E05D 11/06* (2006.01)

(52) U.S. Cl. .............................. 16/367; 16/330; 16/340

(58) Field of Classification Search .................. 16/367, 16/338–340, 380, 330, 303; 403/153, 154, 403/277; 361/680–683, 814; 379/433.12, 379/433.13; 455/575.1, 575.4, 575.8, 550.1, 455/90.3

See application file for complete search history.

(56) References Cited

U.S. PATENT DOCUMENTS

| | | | |
|---|---|---|---|
| 5,940,936 A * | 8/1999 | Lu | 16/337 |
| 6,018,847 A * | 2/2000 | Lu | 16/337 |
| 6,421,878 B1 * | 7/2002 | Kaneko et al. | 16/330 |
| 6,742,221 B1 * | 6/2004 | Lu et al. | 16/367 |
| 6,763,552 B1 * | 7/2004 | Kitamura et al. | 16/337 |
| 6,779,234 B1 * | 8/2004 | Lu et al. | 16/340 |
| 6,804,861 B1 * | 10/2004 | Hsu | 16/366 |
| 6,845,546 B1 * | 1/2005 | Lu et al. | 16/367 |
| 2005/0150080 A1 * | 7/2005 | Lu et al. | 016/367 |
| 2005/0155183 A1 * | 7/2005 | Lu et al. | 016/340 |

FOREIGN PATENT DOCUMENTS

| | | | |
|---|---|---|---|
| DE | 4218253 A1 | * | 12/1992 |
| JP | 2000054715 A | * | 2/2000 |
| JP | 2001227229 A | * | 8/2001 |
| JP | 2003304316 A | * | 10/2003 |
| KR | 2004003447 A | * | 1/2004 |

* cited by examiner

*Primary Examiner*—Chuck Y. Mah
(74) *Attorney, Agent, or Firm*—Dellett & Walters

(57) ABSTRACT

A hinge used for a mobile device includes a base mounted on a body of the mobile device. A bracket is rotatably mounted on the base by an upright pintle. A positioning washer is provided between the bracket and the base. A seat is mounted on the bracket, and a lateral pintle is rotatably installed on the seat and substantially perpendicular to the upright pintle. A monitor of the mobile device is installed on the lateral pintle. Whereby, the monitor can be raised while the lateral pintle is rotated about the seat, and can be turned left or right for adjusting a horizontal visual angle while the bracket is rotated about the upright pintle.

6 Claims, 6 Drawing Sheets

HINGE

BACKGROUND OF THE INVENTION

1. Field of the Invention

The present invention relates to a hinge, and more particularly to a hinge which can be respectively rotated about two axes perpendicular to each other.

2. Description of Related Art

A mobile apparatus such as a mobile phone, notebook computer or PDA (Personal Digital Assistant), generally has a body and a monitor pivotally mounted on the body. However, the monitor only can be pivoted about a horizontal axis between the monitor and the body for raising the monitor, and can not be turned left or right about a vertical axis.

Therefore, the invention provides a hinge to mitigate or obviate the aforementioned problems.

SUMMARY OF THE INVENTION

The main objective of the present invention is to provide a hinge which can be respectively rotated about two axes respectively perpendicular to each other.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
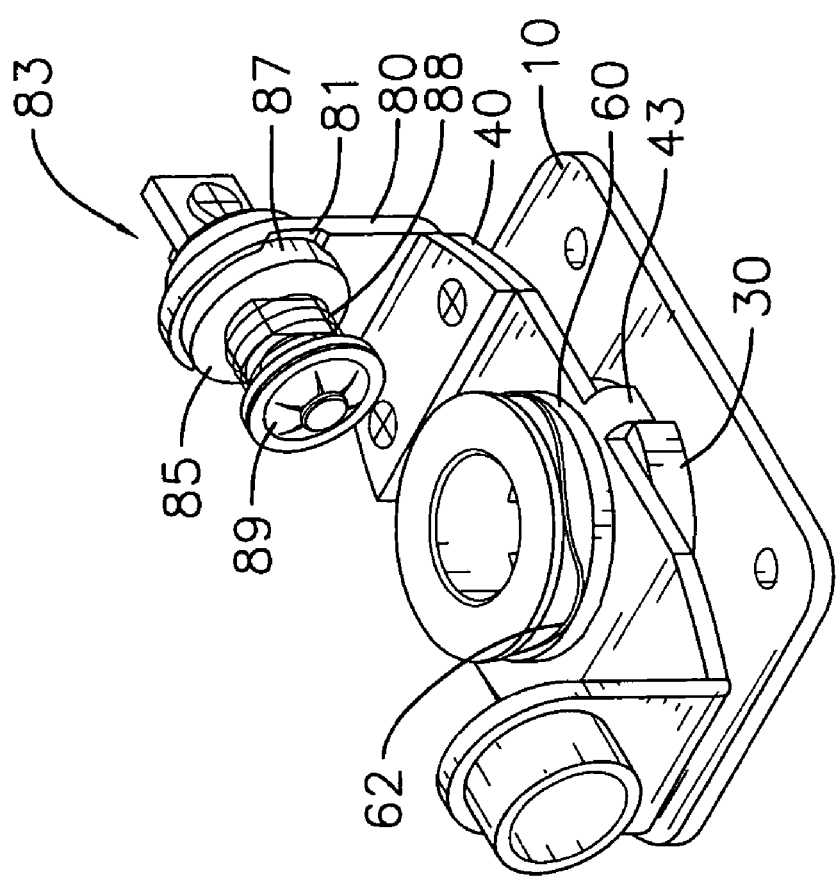
FIG. 1 is a perspective view of a hinge in accordance with the present invention.
Figure 2:
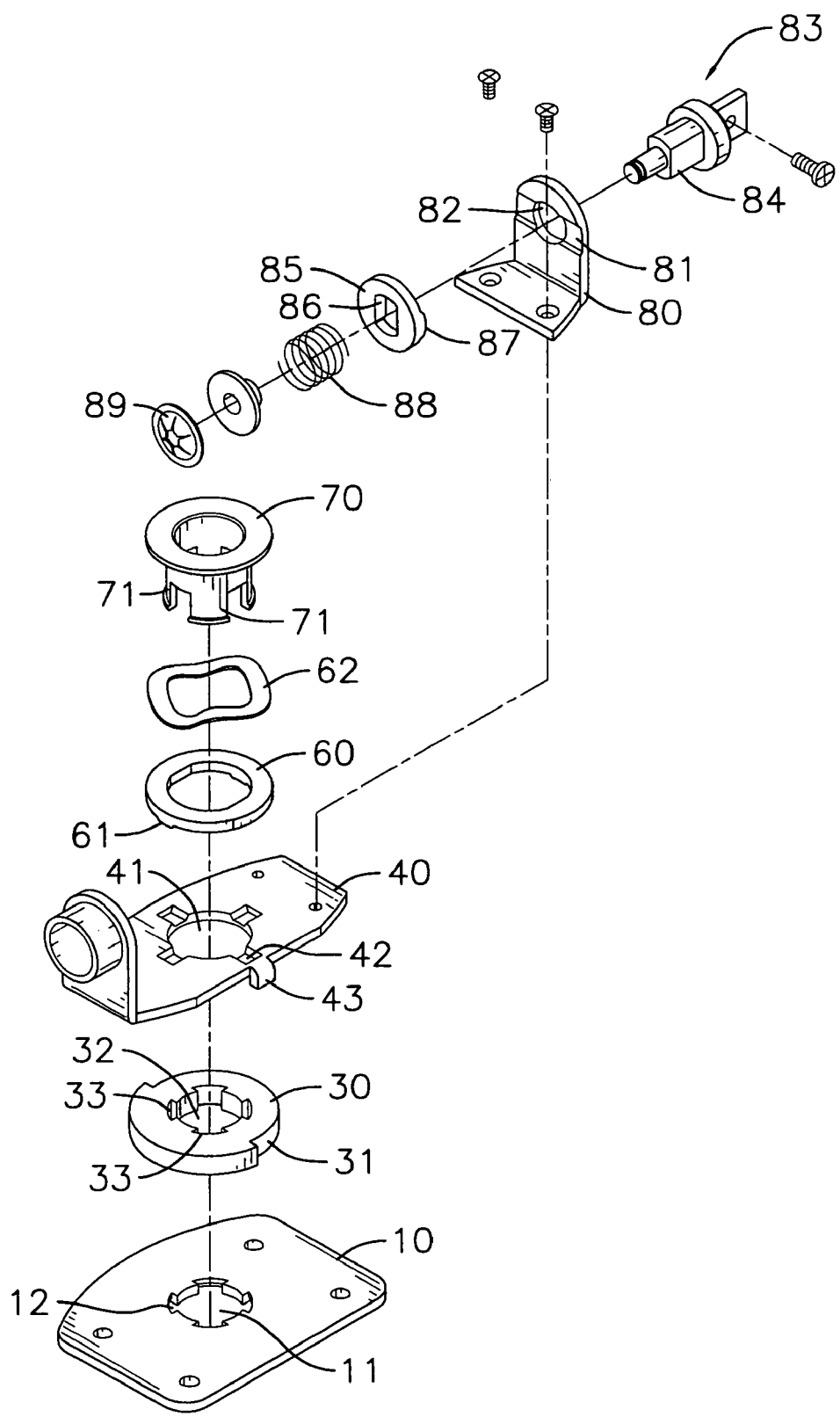
FIG. 2 is an exploded perspective view of the hinge in FIG. 1.
Figure 3:
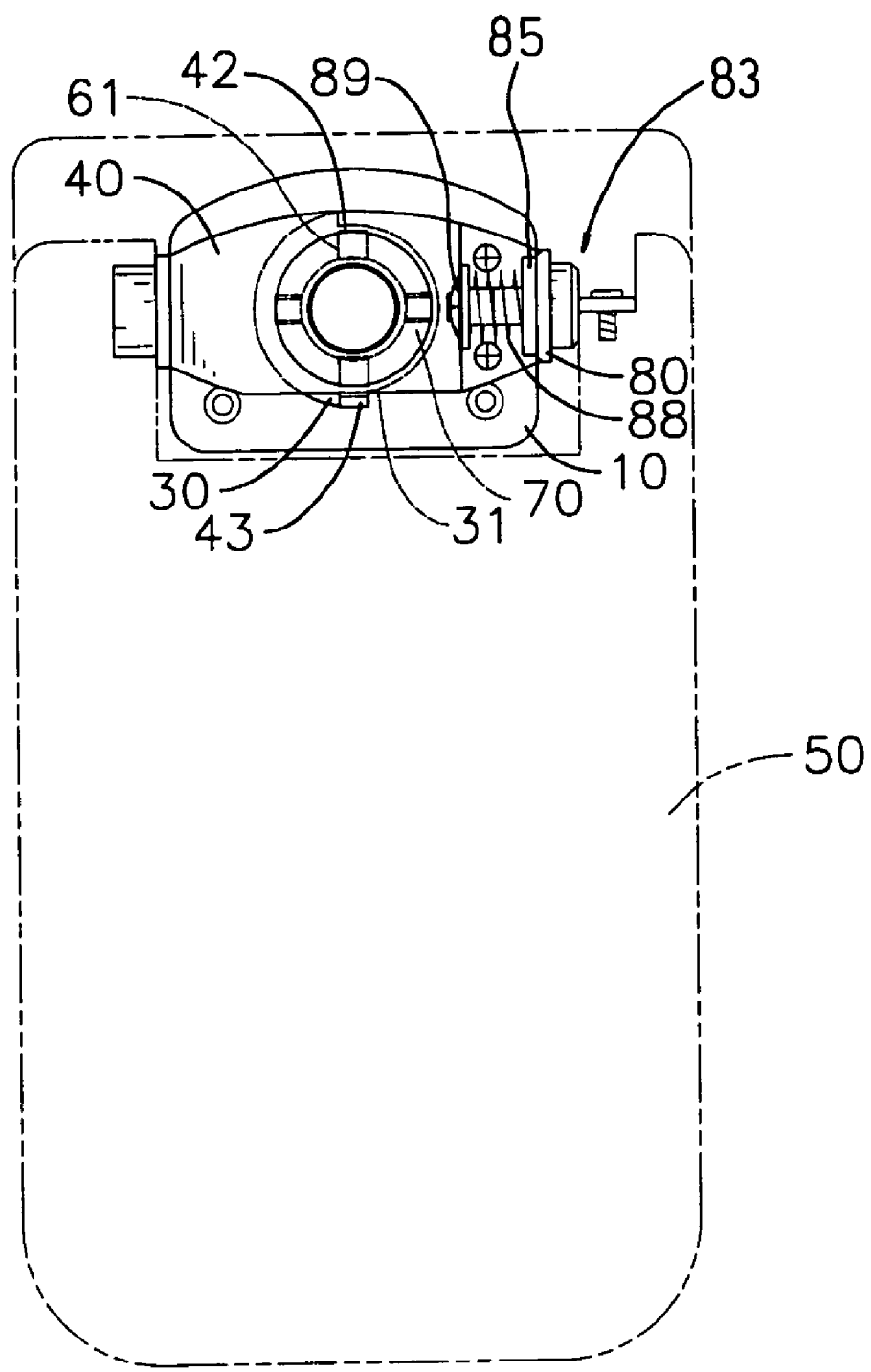
FIG. 3 is a top view of the hinge in FIG. 1.

With reference to FIGS. 1–4, a hinge in accordance with the present invention can be used in a mobile device such as mobile phone, notebook computer, PDA etc.

The hinge has a base (10) installed on a body (20) with a keyboard (not shown) of the mobile device. The base (10) has a first opening (11) defined therethrough, and multiple first arcuate notches (12) evenly defined in the periphery defining the first opening (11).

A positioning washer (30) has a second opening (32) defined therethrough and aligned with the first opening (11) when fitted to the base (10). Multiple second arcuate notches (33) are evenly defined in the periphery defining the second opening (32) and correspond to the first arcuate notches (12). A positioning notch (31) is defined at an outer circumference of the positioning washer (30).

An L-like bracket (40) is installed on a monitor (50) and the positioning washer (30) is provided between the base (10) and the L-like bracket (40). A third opening (41) is defined through the bracket (40) and corresponds to the first and second openings (11, 32). Multiple recesses (42) are evenly defined in the periphery defining the third opening (41). An ear (43) is formed at a side of the bracket (40) for locating in the positioning notch (31).

An upright pintle (70) has a flange and multiple fingers (71) extending from the flange through the L-like bracket (40), the positioning washer (30), and the base (10). The fingers (71) are respectively positioned in the second arcuate notches (33) and first arcuate notches (12). Thus, the L-like bracket (40) is rotatable about the positioning washer (30) and the base (10).

A washer (60) is provided outside the upright pintle (70) and between the flange and the L-like bracket (40). Multiple lugs (61) are formed at a bottom side of the washer (60) and respectively positioned in the recesses (42) of the bracket (40). An elastic ring (62) is provided outside the upright pintle (70) and between the flange and the washer (60).

A seat (80) is mounted on the L-like bracket (40) and has an upright portion. A hole (82) is defined through the upright portion of the seat (80). A channel (81) is defined at an inner wall of the upright portion facing the upright pintle (70) and transversely extends through the hole (82).

A lateral pintle (83) is rotatably mounted on the seat (80) and substantially perpendicular to the upright pintle (70). The lateral pintle (83) has a shaft (84) with a non-circular cross section extending through the hole (82), and a distal end opposed to the shaft (84) and fastened on the monitor (50). A disk (85) is provided outside the shaft (84) and has an aperture (86) with a non-circular cross section corresponding to the shaft (84). Two protrusions (87) are formed at a side of the disk (85) facing the upright portion of the seat (80), and positioned in the channel (81). A collar (89) is mounted on the shaft (84), and a resilient member (88) is provided between the collar (89) and the disk (85).

Figure 4:
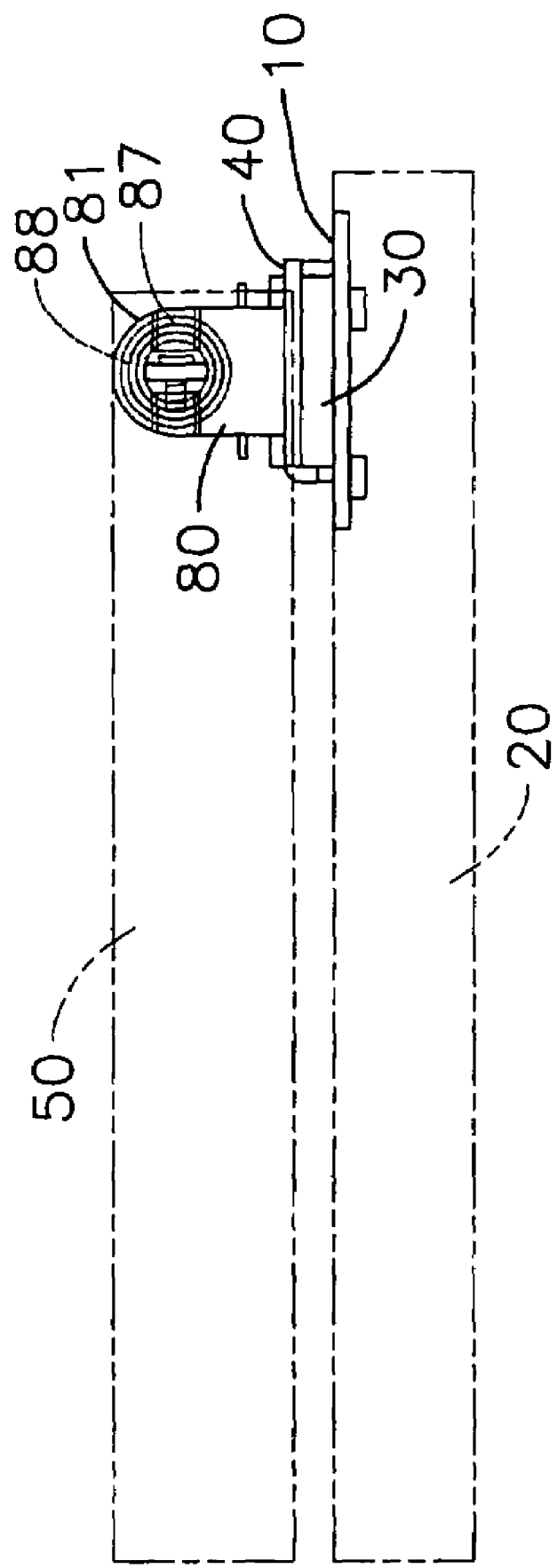
FIG. 4 is a side view of the hinge in FIG. 1.
Figure 5:
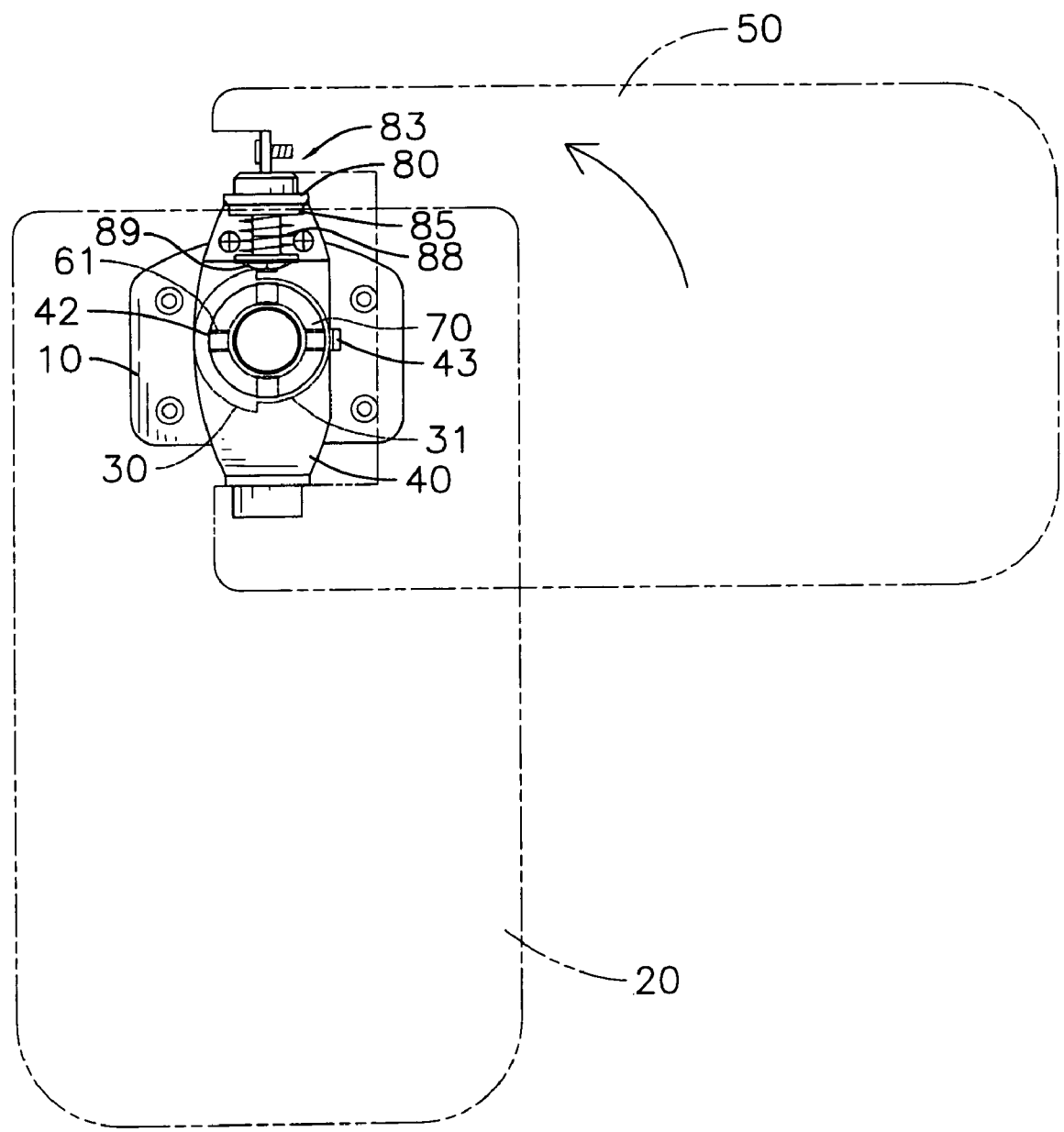
FIG. 5 is a top view of the hinge turning about a vertical axis.
Figure 6:
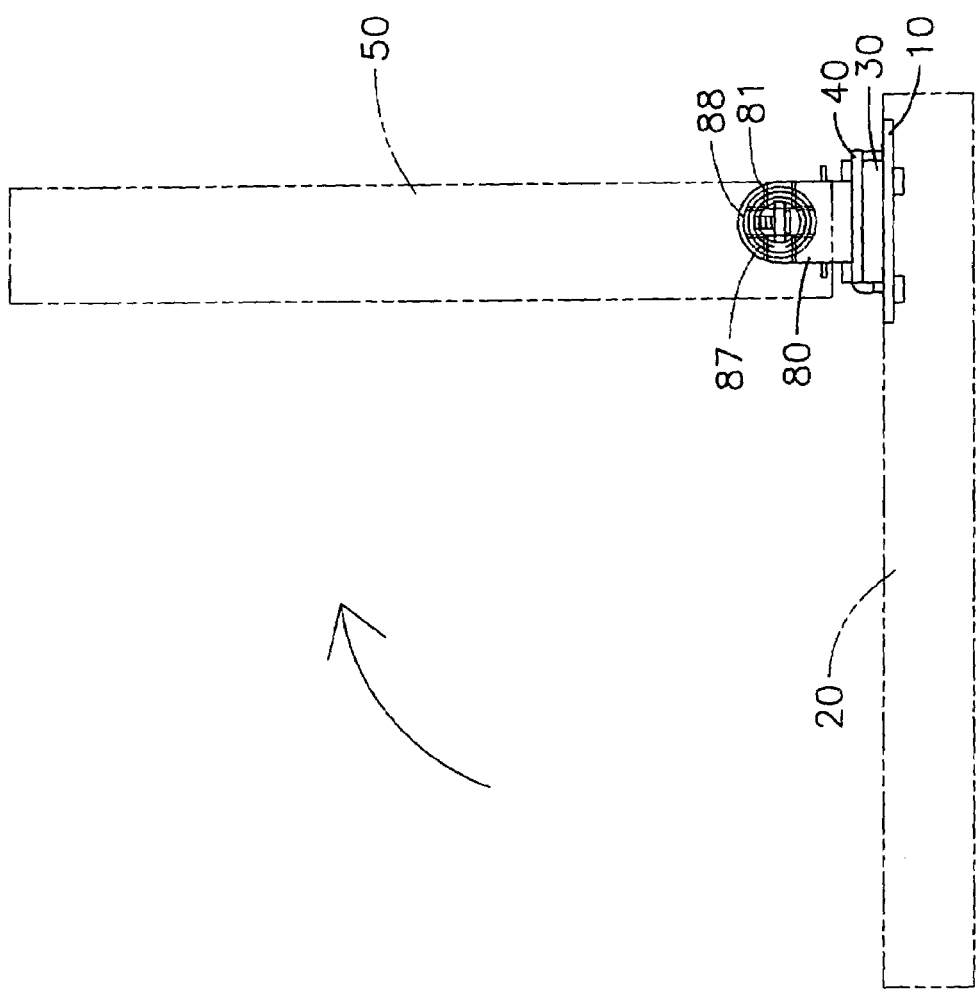
FIG. 6 is a side view of the hinge turning about a horizontal axis.

With reference to FIGS. 4, 5 and 6, the monitor (50) can be raised from the body (20) while the lateral pintle (83) is turned about the seat (80), and the monitor (50) also can be turned right or left for adjusting a horizontal visual angle while the L-like bracket (40) is turned about the upright pintle (70). The maximum rotatable angle of the L-like bracket (40) is limited by the positioning notch (31). Furthermore, the monitor (50) can be positioned at some special angles where the lugs (61) are positioned in the corresponding recesses (42) of the L-like bracket (40).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge comprising:

a base (10) defining a first opening (11) and multiple first arcuate notches (12) defined in a periphery defining the first opening (11);

a positioning washer (30) provided on the base (10) and defining a second opening (32) aligned with the first opening (11), multiple second arcuate notches (33) defined in a periphery defining the second opening (32) and aligned with the first arcuate notches (12), and a positioning notch (31) defined at an outer circumference of the positioning washer (30);

a bracket (40) defining a third opening (41) aligned with the second opening (32), and having an ear (43) formed at a side of the bracket (40) for locating in the positioning notch (31);

an upright pintle having a flange and multiple fingers (71) extending from the flange in turn rotatably through the third opening (41) of the bracket (40), and through the second arcuate notches (33) of the positioning washer (30) and the first arcuate notches (12) of the base (10), and respectively positioned in the second arcuate notches (33) and the first arcuate notches (12) of the base (10) to enable the L-like bracket (40) to rotate about the base (10) and positioning washer (30); and a seat (80) mounted on the L-like bracket (40), and a lateral pintle (83) rotatably mounted in the seat (80) and substantially perpendicular to the upright pintle (70).

2. The hinge as claimed in claim 1, wherein the seat (80) has a hole (82) defined through an upright portion of the seat (80), a channel (81) defined at an inner wall of the upright portion facing the upright pintle (70) and transversally extending through the hole (82); the lateral pintle (83) has a shaft (84) extending through the hole (82), a disk (85) provided outside the shaft (84) and having two protrusions (87) formed at a side of the disk (85) facing the upright portion of the seat (80) and positioned in the channel (81), a collar (89) mounted on the shaft (84), and a resilient member (88) provided between the collar (89) and the disk (85).

3. The hinge as claimed in claim 2, wherein the shaft (84) has a non-circular cross section, and the disk (85) has an aperture (86) with a non-circular cross section corresponding to the shaft (84).

4. The hinge as claimed in claim 1 further comprising a washer (60) provided outside the upright pintle (70) and between the flange and the L-like bracket (40).

5. The hinge as claimed in claim 4 further comprising an elastic ring (62) provided outside the upright pintle (70) and between the flange and the washer (60).

6. The hinge as claimed in claim 1, wherein the bracket (40) has multiple recesses (42) evenly defined around the third opening (41), and the washer (60) has multiple lugs (61) formed at a bottom side of the washer (60) and respectively positioned in the recesses (42) of the bracket (40).

* * * * *